US011626778B2

(12) United States Patent
Tsuchiya et al.

(10) Patent No.: US 11,626,778 B2
(45) Date of Patent: Apr. 11, 2023

(54) STATOR OF ROTATING ELECTRICAL MACHINE FOR VEHICLE (71) Applicant: TOYOTA JIDOSHA KABUSHIKI KAISHA, Toyota (JP)

(72) Inventors: Yukio Tsuchiya, Toyota (JP); Akihide Takehara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 17/190,645

(22) Filed: Mar. 3, 2021

(65) Prior Publication Data
US 2021/0344247 A1 Nov. 4, 2021

(30) Foreign Application Priority Data

Apr. 30, 2020 (JP) .............. JP2020-080807

(51) Int. Cl.
H02K 11/25 (2016.01)
H02K 3/50 (2006.01)
H02K 3/52 (2006.01)
H02K 5/22 (2006.01)

(52) U.S. Cl.
CPC .............. *H02K 11/25* (2016.01); *H02K 3/50* (2013.01); *H02K 3/52* (2013.01); *H02K 5/225* (2013.01); *H02K 2203/09* (2013.01)

(58) Field of Classification Search
CPC .......... H02K 11/25; H02K 5/225; H02K 3/28; H02K 3/522; H02K 3/50; H02K 3/52; H02K 2203/09; H02K 5/22
USPC ....................... 310/71, 68 B, 68 C
See application file for complete search history.

(56) References Cited

U.S. PATENT DOCUMENTS

| | | | | |
|---|---|---|---|---|
| 6,429,556 B1* | 8/2002 | Nakamura | ............... | H02K 3/50 310/71 |
| 2013/0270973 A1* | 10/2013 | Ikemoto | ................. | H02K 11/25 310/680 |
| 2016/0329764 A1* | 11/2016 | Mizutani | ................. | H02K 3/12 |
| 2020/0274422 A1* | 8/2020 | Murooka | ............... | G01K 13/00 |

FOREIGN PATENT DOCUMENTS

| JP | 2016129446 A | * | 7/2016 |
|---|---|---|---|
| JP | 2019-110676 A | | 7/2019 |

OTHER PUBLICATIONS

Ito Keisuke, Rotary Electric Machine Stator, Jul. 14, 2016, JP 2016129446 (English Machine Translation) (Year: 2016).*

* cited by examiner

*Primary Examiner* — Alexander A Singh
(74) *Attorney, Agent, or Firm* — Oblon, McClelland, Maier & Neustadt, L.L.P.

(57) ABSTRACT

A first U-shaped part that is bent so as to form a pair of opposite surfaces facing each other, and a second U-shaped part that is bent so as to form a pair of opposite surfaces facing each other are provided side by side in a bus bar main body of a neutral conductor bus bar. One of the first pair of opposite surfaces and one of the second pair of opposite surfaces are located in the same plane, and the other of the first pair of opposite surfaces and the other of the second pair of opposite surfaces are located in the same plane. A temperature sensor is retained by being inserted through a gap between the first pair of opposite surfaces and a gap between the second pair of opposite surfaces.

8 Claims, 6 Drawing Sheets

FIRST DIRECTION
SECOND DIRECTION
THIRD DIRECTION

STATOR OF ROTATING ELECTRICAL MACHINE FOR VEHICLE

CROSS-REFERENCE TO RELATED APPLICATION

This application claims priority to Japanese Patent Application No. 2020-080807 filed on Apr. 30, 2020, incorporated herein by reference in its entirety.

BACKGROUND

1. Technical Field

The present disclosure relates to a stator of a rotating electrical machine for a vehicle including a temperature sensor that measures the temperature in a bus bar connected to a coil.

2. Description of Related Art

There are known stators of rotating electrical machines for vehicles in which a bus bar is provided with a bent part and a temperature sensor is retained inside the bent part. One example is the stator described in Japanese Patent Application Publication No. 2019-110676 (JP 2019-110676 A).

SUMMARY

To increase the measurement accuracy of the temperature in a bus bar, a heat receiving area of a temperature sensor that receives heat from the bus bar needs to be increased. Increasing the heat receiving area of the temperature sensor in the stator of a rotating electrical machine for a vehicle described in JP 2019-110676 A requires increasing the width of the bus bar that comes into contact with the temperature sensor on the inner side of the bent part. However, increasing the width of the bus bar increases the size of the bus bar.

Having been devised in view of this situation, the present disclosure aims to provide a stator of a rotating electrical machine for a vehicle that makes it possible to increase the heat receiving area of a temperature sensor that receives heat from a bus bar, without increasing the width of the bus bar, to maintain the measurement accuracy of the temperature in the bus bar.

The gist of a first aspect is as follows: A stator of a rotating electrical machine for a vehicle, the stator including: a coil wound around a stator core having a cylindrical shape centered on an axis; a bus bar connected to the coil; and a temperature sensor that measures the temperature in the bus bar, wherein: (a) the bus bar has a bus bar main body that is extended into an elongated shape, and a connection terminal that connects the bus bar main body and the coil to each other; (b) a first bent part that is bent so as to form a pair of first opposite surfaces facing each other, and a second bent part that is bent so as to form a pair of second opposite surfaces facing each other are provided side by side in the bus bar main body; (c) one of the pair of first opposite surfaces and one of the pair of second opposite surfaces are located in the same plane, and the other of the pair of first opposite surfaces and the other of the pair of second opposite surfaces are located in the same plane; and (d) the temperature sensor is retained by being inserted through a gap between the pair of first opposite surfaces and a gap between the pair of second opposite surfaces.

The gist of a second aspect is that, in the first aspect: (a) the bus bar main body is extended into an elongated shape in a circumferential direction of the stator core; and (b) the first bent part and the second bent part are extended toward the outer circumferential side in a radial direction of the stator core and then bent toward the inner circumferential side in the radial direction.

The gist of a third aspect is that, in the second aspect, the first bent part and the second bent part are each bent into a U-shape in a plane including the axis.

The gist of a fourth aspect is that, in the second or third aspect: (a) a thickness direction of the bus bar main body is a direction parallel to the axis; and (b) the connection terminal has a structure of being extended from the bus bar main body toward the inner circumferential side in the radial direction and then bent in a direction parallel to the axis.

The gist of a fifth aspect is that, in any one of the first to fourth aspects: (a) a coupling part that is bent into a U-shape and couples the first bent part and the second bent part to each other is formed between the first bent part and the second bent part; (b) the coupling part has a connection surface that is located in the same plane as those of the pair of first opposite surfaces and the pair of second opposite surfaces that are located on the side of the coupling part; and (c) the temperature sensor is in contact with the connection surface.

The gist of a sixth aspect is that, in the fifth aspect, the area of a cross-section of each of the first bent part, the second bent part, and the coupling part cut along a width direction is equal to the area of a cross-section of the bus bar main body cut along a width direction.

The gist of a seventh aspect is that, in any one of the first to sixth aspects: (a) the coil is one of Y-connected three-phase coils; and (b) the bus bar main body is a neutral conductor of the coil.

According to the stator of a rotating electrical machine for a vehicle of the first aspect, (a) the bus bar has the bus bar main body that is extended into an elongated shape, and the connection terminal that connects the bus bar main body and the coil to each other; (b) the first bent part that is bent so as to form the pair of first opposite surfaces facing each other, and the second bent part that is bent so as to form the pair of second opposite surfaces facing each other are provided side by side in the bus bar main body; (c) one of the pair of first opposite surfaces and one of the pair of second opposite surfaces are located in the same plane, and the other of the pair of first opposite surfaces and the other of the pair of second opposite surfaces are located in the same plane; and (d) the temperature sensor is retained by being inserted through the gap between the pair of first opposite surfaces and the gap between the pair of second opposite surfaces. Thus, the temperature sensor is retained by being inserted through the gap between each of the pair of first opposite surfaces and the pair of second opposite surfaces, i.e., more than one gap. Compared with when the temperature sensor is retained by being inserted through a single gap, the heat receiving area of the temperature sensor that receives heat from the bus bar can be increased to maintain the measurement accuracy of the temperature in the bus bar. For example, having a large heat receiving area, the temperature sensor can achieve high responsiveness to changes in the temperature of the bus bar in temperature measurement. Moreover, having a large heat receiving area, the temperature sensor is likely to maintain robustness in measurement accuracy even when the mounting position of the temperature sensor deviates to some extent in the insertion direction while the temperature sensor is mounted so as to be retained by being inserted through the gap between the pair of first opposite surfaces and the gap between the pair of second opposite surfaces in the bus bar main body.

According to the stator of a rotating electrical machine for a vehicle of the second aspect, in the first aspect, (a) the bus bar main body is extended into an elongated shape in the circumferential direction of the stator core, and (b) the first bent part and the second bent part are extended toward the outer circumferential side in the radial direction of the stator core and then bent toward the inner circumferential side in the radial direction. The gap between the pair of first opposite surfaces formed by the first bent part and the gap between the pair of second opposite surfaces formed by the second bent part both open in the circumferential direction of the stator core. This allows the temperature sensor to be inserted along the circumferential direction in which these gaps open, which can increase the efficiency with which the temperature sensor is mounted to the bus bar.

According to the stator of a rotating electrical machine for a vehicle of the third aspect, in the second aspect, the first bent part and the second bent part are each bent into a U-shape in a plane including the axis. Surfaces through which the temperature sensor can receive heat from the bus bar include, other than the pair of first opposite surfaces and the pair of second opposite surfaces, inner surfaces of the first bent part and the second bent part that are bent into a U-shape. Thus, the temperature sensor can receive more heat from the bus bar and maintain the measurement accuracy of the temperature in the bus bar.

According to the stator of a rotating electrical machine for a vehicle of the fourth aspect, in the second or third aspect, (a) the thickness direction of the bus bar main body is a direction parallel to the axis, and (b) the connection terminal has a structure of being extended from the bus bar main body toward the inner circumferential side in the radial direction and then bent in a direction parallel to the axis. The connection terminal has a structure of being extended from the bus bar main body toward the inner circumferential side in the radial direction of the stator core and then bent only at one part in a direction parallel to the axis of the stator core. Thus, the distance between the bus bar main body and the connection terminal in the radial direction can be reduced to keep the size of the bus bar down.

According to the stator of a rotating electrical machine for a vehicle of the fifth aspect, in any one of the first to fourth aspects, (a) the coupling part that is bent into a U-shape and couples the first bent part and the second bent part to each other is formed between the first bent part and the second bent part; (b) the coupling part has the connection surface that is located in the same plane as those of the pair of first opposite surfaces and the pair of second opposite surfaces that are located on the side of the coupling part; and (c) the temperature sensor is in contact with the connection surface. Surfaces through which the temperature sensor can receive heat from the bus bar include, other than the pair of first opposite surfaces and the pair of second opposite surfaces, the connection surface of the coupling part. Thus, the temperature sensor can receive more heat from the bus bar and maintain the measurement accuracy of the temperature in the bus bar.

According to the stator of a rotating electrical machine for a vehicle of the sixth aspect, in the fifth aspect, the area of the cross-section of each of the first bent part, the second bent part, and the coupling part cut along the width direction is equal to the area of the cross-section of the bus bar main body cut along the width direction. This allows a current to flow through the bus bar at the same current density in the first bent part, the second bent part, and the coupling part and in the bus bar main body. As a result, the bus bar is likely to generate an equal amount of heat at parts in the longitudinal direction, including the first bent part, the second bent part, and the coupling part, which helps maintain the measurement accuracy of the temperature in the bus bar.

According to the stator of a rotating electrical machine for a vehicle of the seventh aspect, in any one of the first to sixth aspects, (a) the coil is one of Y-connected three-phase coils, and (b) the bus bar main body is a neutral conductor of the coil. Heat generated in each coil of the Y-connected three-phase coils is conducted to the neutral conductor bus bar from one end of the coil. Therefore, the temperature sensor retained by the neutral conductor bus bar can accurately measure the temperature of the coil wound around the stator core.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described in detail below with reference to the drawings. The drawings in the embodiment to be described below are simplified or modified as necessary to help understand the present disclosure and do not necessarily exactly represent the dimensional ratios, shapes, etc. of parts.

Figure 1:
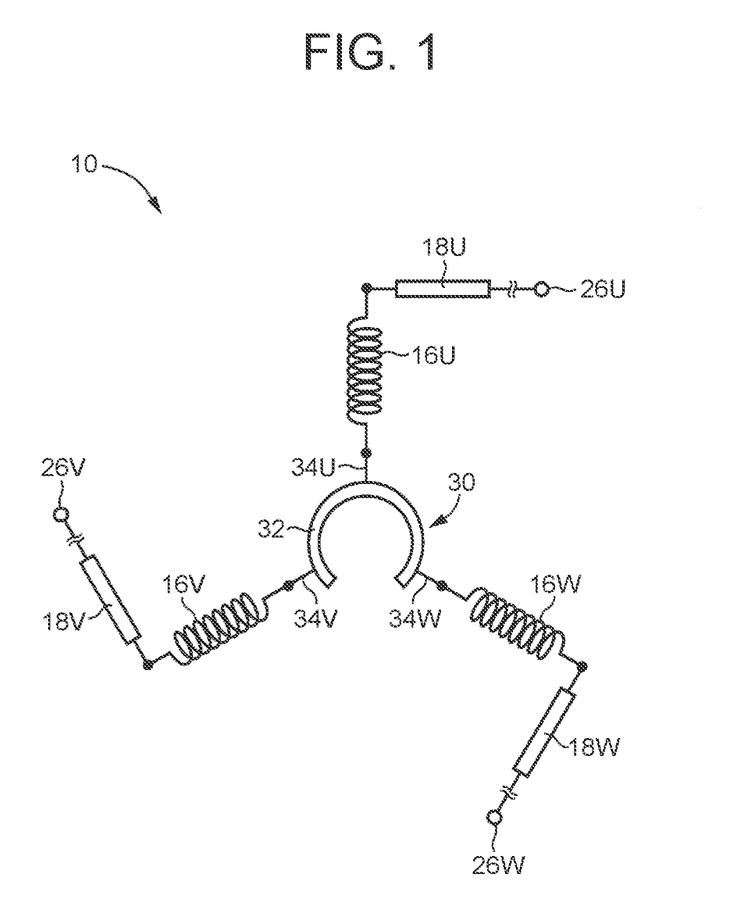
FIG. 1 is a view illustrating the circuit configuration of a stator of a rotating electrical machine for a vehicle according to an embodiment of the present disclosure.

FIG. 1 is a view illustrating the circuit configuration of a stator 10 of a rotating electrical machine MG for a vehicle according to the embodiment of the present disclosure. The stator 10 has Y-connected three-phase coils 16U, 16V, 16W. One end of each of the three-phase coils 16U, 16V, 16W is connected to a neutral conductor bus bar 30. The other ends of the three-phase coils 16U, 16V, 16W are respectively connected to external terminals 26U, 26V 26W through terminal bus bars 18U, 18V, 18W and power lines 24U, 24V, 24W (see FIG. 2). The coils 16U, 16V, 16W are coils of the respective phases in a three-phase three-coil configuration, for example, a U-phase, a V-phase, and a W-phase. For example, when the rotating electrical machine MG for a vehicle is driven to rotate, a three-phase alternating current is input into the external terminals 26U, 26V, 26W. Hereinafter, unless it is necessary to make distinctions among the coils 16U, 16V, 16W according to the phase, these coils will be referred to simply as the "coils 16." One of the Y-connected three-phase coils 16U, 16V, 16W corresponds to the "coil" in the present disclosure, and the neutral conductor bus bar 30 corresponds to the "bus bar" in the present disclosure.

Figure 2:
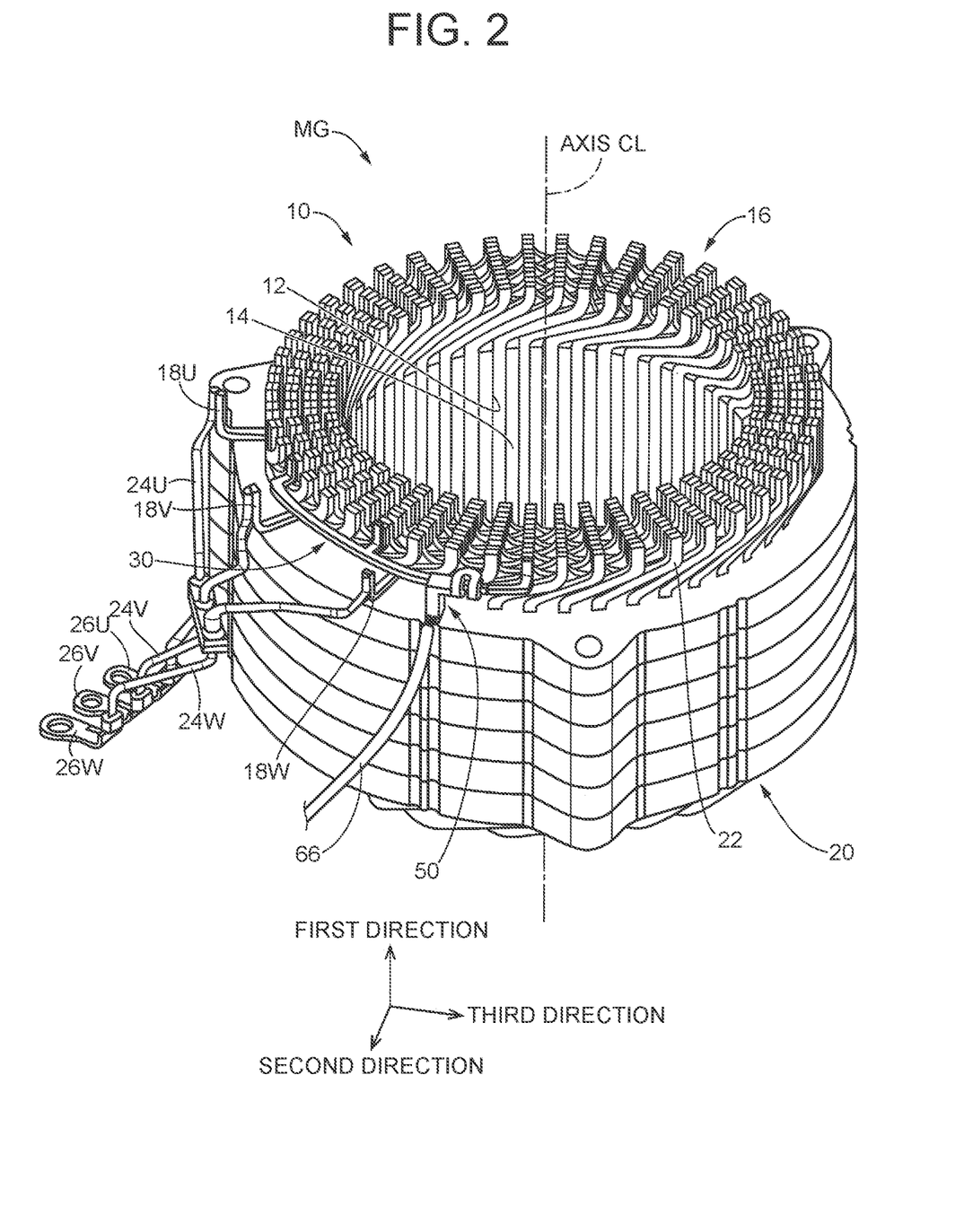
FIG. 2 is a perspective view of the stator of a rotating electrical machine for a vehicle shown in FIG. 1, in a state where a temperature sensor that measures the temperature of a neutral conductor bus bar is retained.

FIG. 2 is a perspective view of the stator 10 of the rotating electrical machine MG for a vehicle shown in FIG. 1, in a state where a temperature sensor 50 that measures the temperature of the neutral conductor bus bar 30 is retained.

The stator 10 includes a stator core 20, the coils 16, the neutral conductor bus bar 30, and the temperature sensor 50.

The stator core 20 has a cylindrical shape centered on an axis CL that is formed by stacking, for example, a plurality of magnetic steel sheets. An inner circumferential surface of the cylindrical stator core 20 is provided with a plurality of grooves, i.e., slots 12, each of which has a depth in a direction toward an outer circumferential direction in a radial direction centered on the axis CL and extends through the stator core 20 in a direction parallel to the axis CL. Hereinafter, the radial direction centered on the axis CL will be referred to simply as the "radial direction," and the direction parallel to the axis CL will be referred to simply as the "direction of the axis CL." Teeth 14 are each formed between adjacent slots 12. The coils 16 are wound around the teeth 14 of the stator core 20. The stator core 20 is not necessarily limited to being formed by magnetic steel sheets but may instead be formed by, for example, molding a powdered or solid magnetic material.

The coil 16 is formed by, for example, inserting a plurality of substantially U-shaped segment coils into the slots 12 and then electrically connecting end portions of the segment coils that protrude from the slots 12 to an outside of the stator core 20 by welding. The segment coils are so-called flat conductors having a rectangular cross-section like elongated conductor plates, with insulation coating, such as enamel coating, applied to surfaces. Portions of the coil 16 that protrude from the slots 12 to the outside of the stator core 20 are coil ends 22.

As described above, the power lines 24U, 24V, 24W respectively connect the terminal bus bars 18U, 18V, 18W and the external terminals 26U, 26V 26W to each other.

The neutral conductor bus bar 30 is extended into an arc shape in the circumferential direction centered on the axis CL, and electrically connects the one end, i.e., the end on the side of the neutral conductor, of each of the Y-connected three-phase coils 16. Thus, the neutral conductor bus bar 30 is a neutral conductor of the Y-connected three-phase coils 16. The temperature sensor 50 that measures the temperature in the neutral conductor bus bar 30 is retained by the neutral conductor bus bar 30. Hereinafter, the circumferential direction centered on the axis CL will be referred to simply as the "circumferential direction."

Figure 3:
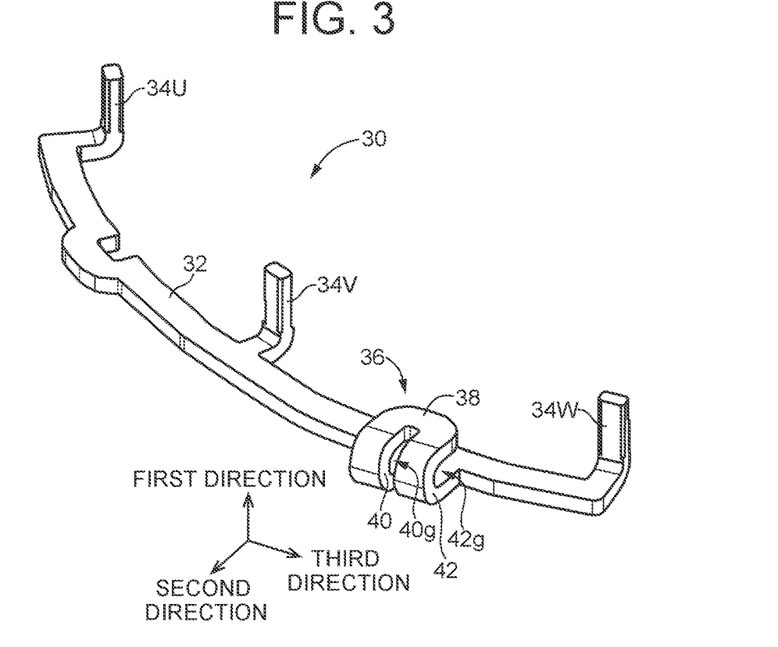
FIG. 3 is a perspective view of the neutral conductor bus bar shown in FIG. 2.

FIG. 3 is a perspective view of the neutral conductor bus bar 30 shown in FIG. 2. The first direction, the second direction, and the third direction shown in FIG. 3 are respectively a direction parallel to the axis CL in a bent part 36 provided in a bus bar main body 32 to be described later, a radial direction in the bent part 36, and a direction of a tangent to the circumferential direction centered on the axis CL at the bent part 36. The arrow directions of the first direction, the second direction, and the third direction indicate one side in the first direction, the second direction, and the third direction, and the directions opposite from these arrows indicate the other side in the first direction, the second direction, and the third direction. The one side in the second direction is an outer circumferential side in the radial direction of the bent part 36, and the other side in the second direction is an inner circumferential side in the radial direction of the bent part 36. The first direction, the second direction, and the third direction are perpendicular to one another. The first direction, the second direction, and the third direction shown in FIG. 2 described above and FIG. 4 to FIG. 7 to be described later are the same as those shown in FIG. 3.

The neutral conductor bus bar 30 has the bus bar main body 32 having an arc shape with the center of curvature located on the axis CL, and connection terminals 34U, 34V, 34W. Hereinafter, unless it is necessary to make distinctions among the connection terminals 34U, 34V, 34W according to the phase, these connection terminals will be referred to simply as the "connection terminals 34." The bus bar main body 32 and the connection terminals 34 are integrally formed.

The bus bar main body 32 is an elongated conductor that is extended in the circumferential direction and has, for example, a rectangular shape in cross-section. In a cross-section of the bus bar main body 32 perpendicular to an extension direction, the shorter distance between opposite surfaces is the thickness of the bus bar main body 32, and the longer distance between opposite surfaces is the width of the bus bar main body 32. A longitudinal direction, a thickness direction, and a width direction of the bus bar main body 32 lie in the circumferential direction, the direction of the axis CL, and the radial direction, respectively.

The bus bar main body 32 is provided with the bent part 36. The bus bar main body 32 and the bent part 36 are integrally formed. The bent part 36 includes a first U-shaped part 40 that is bent so as to form a pair of opposite surfaces 40a, 40b facing each other, and a second U-shaped part 42 that is bent so as to form a pair of opposite surfaces 42a, 42b facing each other (see FIG. 4A and FIG. 7B). The first U-shaped part 40 and the second U-shaped part 42 are provided adjacent to each other in the third direction, i.e., side by side in the third direction.

The first U-shaped part 40 and the second U-shaped part 42 are extended toward the one side in the second direction (the outer circumferential side in the radial direction) and then bent toward the other side in the second direction (the inner circumferential side in the radial direction), so as to be bent into a U-shape in a plane including the axis CL. The first U-shaped part 40 has an inner circumferential surface 40c (see FIG. 4A and FIG. 7B) that is an inner surface of the U-shaped part, and the pair of opposite surfaces 40a, 40b that face each other across a gap 40g in the first direction. The second U-shaped part 42 has an inner circumferential surface 42c (see FIG. 4A) that is an inner surface of the U-shaped part, and the pair of opposite surfaces 42a, 42b that face each other across a gap 42g in the first direction. One opposite surface 40a of the pair of opposite surfaces 40a, 40b and one opposite surface 42a of the pair of opposite surfaces 42a, 42b are located in the same plane, and the other opposite surface 40b of the pair of opposite surfaces 40a, 40b and the other opposite surface 42b of the pair of opposite surfaces 42a, 42b are located in the same plane. The first U-shaped part 40 and the second U-shaped part 42 correspond to the "first bent part" and the "second bent part," respectively, in the present disclosure. The pair of opposite surfaces 40a, 40b and the pair of opposite surfaces 42a, 42b correspond to the "pair of first opposite surfaces" and the "pair of second opposite surfaces," respectively, in the present disclosure.

One end portion of the first U-shaped part 40 is bent toward the side opposite from the second U-shaped part 42, while the other end portion thereof is bent toward the second U-shaped part 42. One end portion of the second U-shaped part 42 is bent toward the side opposite from the first U-shaped part 40, while the other end portion thereof is bent toward the first U-shaped part 40. The other end portion of the first U-shaped part 40 and the other end portion of the second U-shaped part 42 are coupled together by a coupling part 38. The coupling part 38 is bent into a U-shape in a plane orthogonal to the axis CL. Thus, between the first U-shaped part 40 and the second U-shaped part 42, the coupling part 38 is formed that is bent into a U-shape in a plane orthogonal to the axis CL and couples the first U-shaped part 40 and the second U-shaped part 42 together. The coupling part 38 has a connection surface 38a (see FIG. 7B) that is located in the same plane as those opposite surfaces 40b, 42b of the pair of opposite surfaces 40a, 40b and the pair of opposite surfaces 42a, 42b that are located on the side of the coupling part 38, and connects these opposite surfaces 40b, 42b to each other (see FIG. 7B).

The area of a cross-section of each of the first U-shaped part 40, the second U-shaped part 42, and the coupling part 38 cut along a width direction is equal to the area of a cross-section of the bus bar main body 32 cut along a width direction. In a cross-section of each of the first U-shaped part 40, the second U-shaped part 42, and the coupling part 38 perpendicular to an extension direction of that part, the shorter distance between opposite surfaces is the thickness of the first U-shaped part 40, the second U-shaped part 42, or the coupling part 38, and the longer distance between opposite surfaces is the width of the first U-shaped part 40, the second U-shaped part 42, or the coupling part 38.

The connection terminals 34 are terminals for connecting the bus bar main body 32 and the one end of each of the three-phase coils 16 to each other. In the circumferential direction, the neutral conductor bus bar 30 has the connection terminal 34U provided on the side of the one end of the bus bar main body 32, the connection terminal 34W provided on the side of the other end of the bus bar main body 32, and the connection terminal 34V provided at a central part of the bus bar main body 32. The connection terminals 34U, 34V, 34W have a structure of being extended from the bus bar main body 32 toward the other side in the second direction (the inner circumferential side in the radial direction) and then bent toward the one side in the first direction.

Figure 4A:
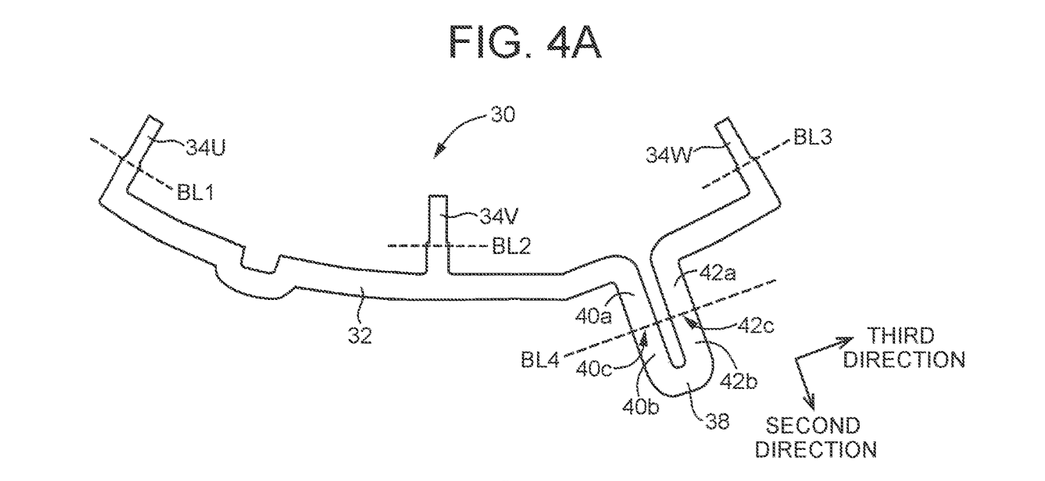
FIG. 4A is a view showing one example of a method to form the neutral conductor bus bar shown in FIG. 3, in a state after punching by a press die is performed.
Figure 4B:
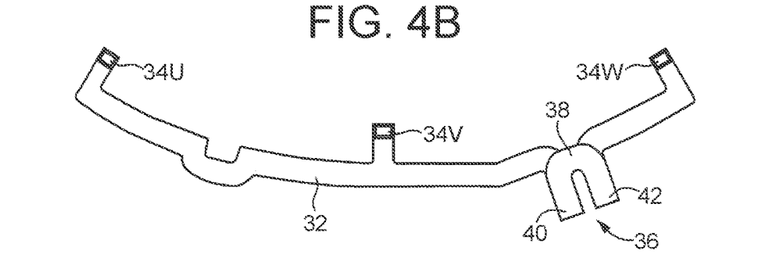
FIG. 4B is a view showing the method, in a state after bending by the press die is performed and the neutral conductor bus bar is formed.

FIG. 4A is a view showing one example of a method to form the neutral conductor bus bar 30 shown in FIG. 3, in a state after punching by a press die is performed, and FIG. 4B is a view showing the method, in a state after bending by the press die is performed and the neutral conductor bus bar 30 is formed. FIG. 4A and FIG. 4B are plan views as seen from the one side in the first direction. Reference numerals corresponding to the parts in FIG. 4B that shows the state after the neutral conductor bus bar 30 is formed are indicated at the same positions in FIG. 4A.

First, a member shaped as shown in FIG. 4A is punched out of, for example, a sheet material having a predetermined thickness by punching (shearing). The member punched out has an arc-shaped part (a part to be processed into the bus bar main body 32) and parts protruding from the arc-shaped part toward the inner circumferential side in the radial direction (parts to be processed into the connection terminals 34U, 34V, 34W). Further, the arc-shaped part is provided with parts that extend parallel to each other toward the outer circumferential side in the radial direction (parts to be processed into the first U-shaped part 40 and the second U-shaped part 42), and a part that connects leading end portions of these parts that extend parallel to each other into a U-shape (a part to be processed into the coupling part 38). Punching is a process of punching a member out of a sheet material by generating shearing stress in metal using punching tools, such as a die and a punch, so as to apply a load exceeding the elastic limit of the material.

Next, those parts of the member shaped as shown in FIG. 4A that protrude from the arc-shaped part toward the inner circumferential side in the radial direction are bent along bending lines BL1 to BL3 so as to extend toward the upper side of the sheet of FIG. 4A (the one side in the first direction). As a result, the connection terminals 34U, 34V, 34W having a structure of being extended from the bus bar main body 32 toward the inner circumferential side in the radial direction and then bent in a direction parallel to the axis CL are formed.

Further, those parts of the member shaped as shown in FIG. 4A that are provided in the arc-shaped part and extend parallel to each other toward the outer circumferential side in the radial direction, and the part of the member that connects the leading end portions of those parts to each other are bent along a bending line BL4 into a U-shape such that the part connecting the leading end portions to each other is located on the inner circumferential side in the radial direction. As a result, the bent part 36 including the first U-shaped part 40 and the second U-shaped part 42 that are bent into a U-shape, and the coupling part 38 is formed. Thus, the first U-shaped part 40 and the second U-shaped part 42 are bent in the same direction along the bending line BL4, and the first U-shaped part 40 and the second U-shaped part 42 are provided adjacent to each other in the third direction, i.e., side by side in the third direction. The first U-shaped part 40 and the second U-shaped part 42 are extended from the bus bar main body 32 toward the outer circumferential side in the radial direction, and are then bent along the bending line BL4 toward the upper side of the sheet of FIG. 4A (the one side in the first direction) and further bent toward the inner circumferential side in the radial direction so as to form a U-shape. Bending along the bending line BL4 can be achieved by one processing. Since the first U-shaped part 40, the second U-shaped part 42, and the connection terminals 34U, 34V, 34W are bent from the bus bar main body 32 toward the same upper side of the sheet of FIG. 4A (the one side in the first direction), the size of the neutral conductor bus bar 30 in the first direction can be reduced.

Thus, the neutral conductor bus bar 30 can be manufactured by punching a sheet material by a press die and then bending the obtained member by the press die, and therefore can be inexpensively manufactured.

Figure 5:
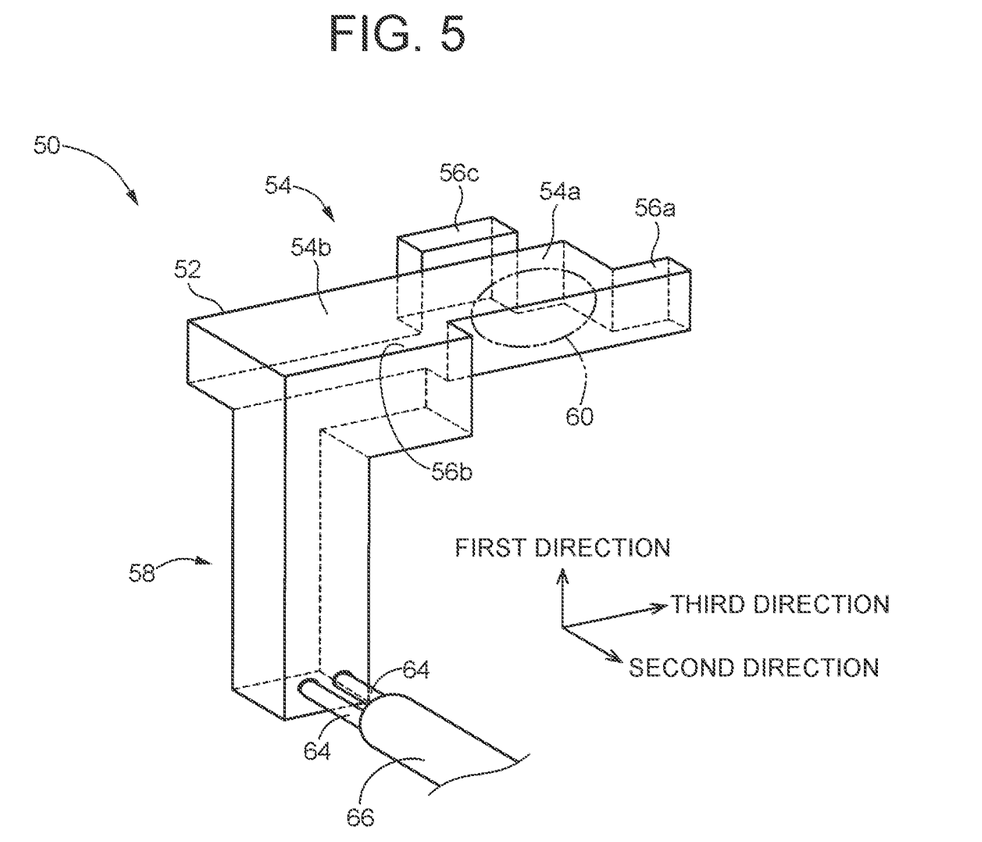
FIG. 5 is a perspective view of the temperature sensor shown in FIG. 2.

FIG. 5 is a perspective view of the temperature sensor 50 shown in FIG. 2. The temperature sensor 50 includes a case 52, a temperature detection element 60, and lead wires 64. In FIG. 5, the shape of the temperature sensor 50 is indicated by solid lines and dashed lines, and a rough position where the temperature detection element 60 is housed is indicated by a long dashed double-short dashed line.

The case 52 has a substantially L-shape and has a main part 54 and a sub-part 58.

The main part 54 has a rectangular parallelepiped shape that is extended so as to be elongated in the third direction. In the third direction, the main part 54 has an insertion portion 54a on one side and an extended portion 54b on the other side. The main part 54 is provided with a first projection 56a, a second projection 56b, and a third projection 56c.

The first projection 56a is provided on an end surface of the insertion portion 54a on the one side in the third direction, and projects from a part of this end surface on the one side in the second direction toward the one side in the third direction. The second projection 56b is provided on an end surface of the extended portion 54b on the one side in the second direction, and projects from this end surface toward the one side in the second direction as well as toward the other side in the first direction. The third projection 56c is provided on an end surface of the insertion portion 54a on the other side in the second direction, and projects from this end surface toward the other side in the second direction, and further projects from the projected position toward the one side in the first direction.

The insertion portion 54a is a portion of the main part 54 that is located between the first projection 56a and the second projection 56b in the third direction, and between the second projection 56b and the third projection 56c in the second direction. The thickness of the insertion portion 54a in the first direction is substantially equal to the dimension of the gap 40g in the pair of opposite surfaces 40a, 40b and the gap 42g between the pair of opposite surfaces 42a, 42b. The width of the insertion portion 54a in the second direction is set such that the insertion portion 54a comes into contact with the connection surface 38a of the coupling part 38 when the temperature sensor 50 is inserted through the gap 40g and the gap 42g as will be described later. The extended portion 54b is a portion of the main part 54 other than the insertion portion 54a, the first projection 56a, the second projection 56b, and the third projection 56c.

The sub-part 58 has a rectangular parallelepiped shape that is extended from the other side of the main part 54 in the third direction toward the other side in the first direction so as to be elongated. The sub-part 58 is provided on end surfaces of the extended portion 54b and the second projection 56b on the other side in the first direction, and projects toward the other side in the first direction from a part of this end surface on the one side in the second direction.

The temperature detection element 60 is housed inside the insertion portion 54a of the case 52. Two lead wires 64 through which output signals indicating the temperature detected by the temperature detection element 60 are output are led out of the case 52 through holes provided in the sub-part 58, on the other side in the first direction. The two lead wires 64 are bundled into a wire harness 66 outside the case 52. A wire harness is a plurality of electric wires bundled together like the two lead wires 64 to allow easy installation in an automobile assembly line.

Figure 6A:
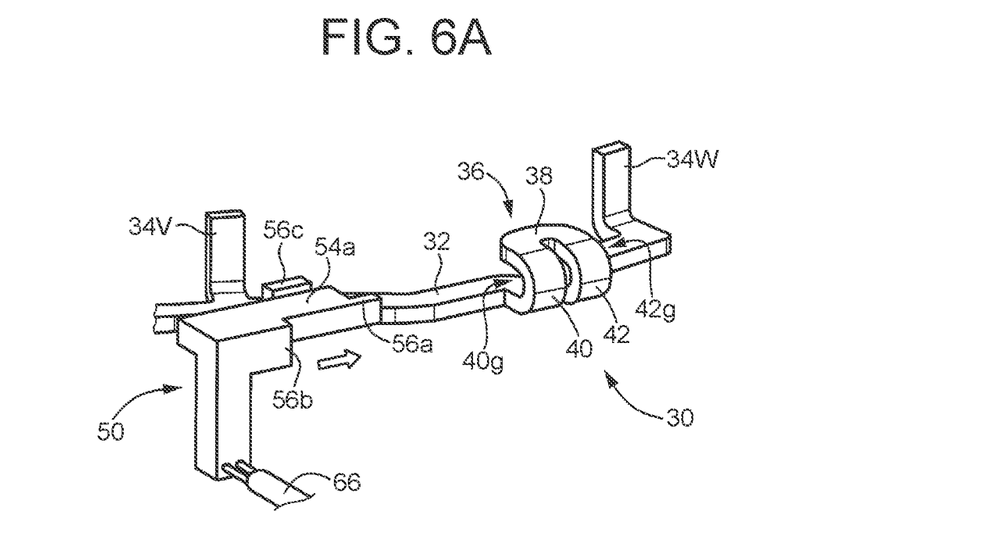
FIG. 6A is a view illustrating a method to retain the temperature sensor in an embodiment of the present disclosure, in a state before the temperature sensor is inserted through a gap formed by each of a first U-shaped part and a second U-shaped part of the neutral conductor bus bar.
Figure 6B:
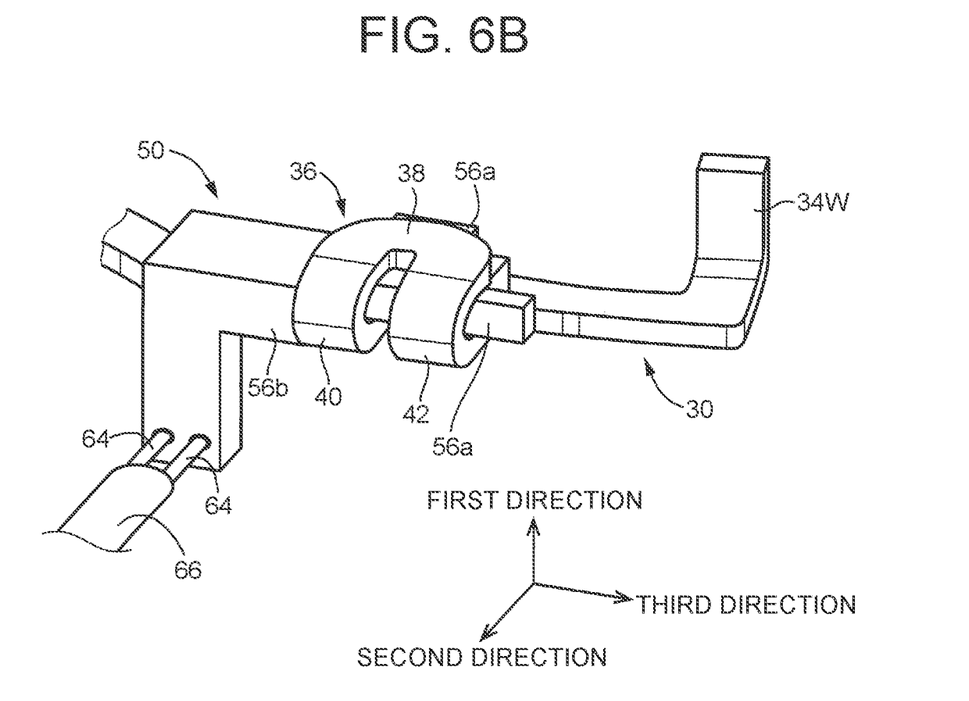
FIG. 6B is a view illustrating the method, in a state after the temperature sensor is inserted and retained.

FIG. 6 is a view illustrating a method to retain the temperature sensor 50 in this embodiment. FIG. 6A shows a state before the temperature sensor 50 is inserted through the gaps 40g, 42g formed by the first U-shaped part 40 and the second U-shaped part 42, respectively, of the neutral conductor bus bar 30, and FIG. 6B shows a state after the temperature sensor 50 is inserted and retained.

The connection terminals 34U, 34V, 34W of the neutral conductor bus bar 30 are each electrically connected by welding, for example, to the one end, i.e., the end on the side of the neutral conductor, of the corresponding one of the Y-connected three-phase coils 16U, 16V, 16W. This connection results in a state where the gap 40g between the pair of opposite surfaces 40a, 40b of the first U-shaped part 40 and the gap 42g between the pair of opposite surfaces 42a, 42b of the second U-shaped part 42 both open in the circumferential direction (to be exact, in the third direction).

Next, the temperature sensor 50 is inserted through the gap 40g and the gap 42g in the direction of the outlined arrow shown in FIG. 6A. Thus, the insertion portion 54a housing the temperature detection element 60 in the temperature sensor 50 is retained by being held between the pair of opposite surfaces 40a, 40b as well as between the pair of opposite surfaces 42a, 42b, which results in the state shown in FIG. 6B. The temperature sensor 50 is retained so as to be in contact with the connection surface 38a of the coupling part 38.

As shown in FIG. 6B, in the state where the temperature sensor 50 is retained by being inserted through the gaps 40g, 42g formed by the first U-shaped part 40 and the second U-shaped part 42, respectively, of the neutral conductor bus bar 30, the temperature sensor 50 is prevented from moving relatively to the neutral conductor bus bar 30 as follows.

Since the insertion portion 54a of the temperature sensor 50 is held between the pair of opposite surfaces 40a, 40b of the first U-shaped part 40 and the pair of opposite surfaces 42a, 42b of the second U-shaped part 42, the temperature sensor 50 is prevented from moving relatively to the neutral conductor bus bar 30 in the first direction. As the third projection 56c of the temperature sensor 50 hits against an end surface of the coupling part 38 of the neutral conductor bus bar 30 on the other side in the second direction, the temperature sensor 50 is prevented from moving relatively to the neutral conductor bus bar 30 toward the one side in the second direction. As the sub-part 58 of the temperature sensor 50 hits against an end surface of the bus bar main body 32 of the neutral conductor bus bar 30 on the one side in the second direction, the temperature sensor 50 is prevented from moving relatively to the neutral conductor bus bar 30 toward the other side in the second direction. As the second projection 56b of the temperature sensor 50 hits against an end surface of the first U-shaped part 40 of the neutral conductor bus bar 30 on the other side in the third direction, the temperature sensor 50 is prevented from moving relatively to the neutral conductor bus bar 30 toward the one side in the third direction.

Thus, relative movement of the temperature sensor 50 relative to the neutral conductor bus bar 30 is limited, and the temperature sensor 50 is temporarily fixed to the neutral conductor bus bar 30. In this state where the temperature sensor 50 is temporarily fixed to the neutral conductor bus bar 30, the neutral conductor bus bar 30 and the temperature sensor 50 are fixed with resin. The configuration of this fixation with resin may be such that, in addition to the neutral conductor bus bar 30 and the temperature sensor 50, the coil ends 22 are fixed with resin along the entire circumference of the stator core 20 in the circumferential direction, or such that the neutral conductor bus bar 30 and the temperature sensor 50 are fixed with resin at part of the stator core 20 in the circumferential direction. As the neutral conductor bus bar 30 and the temperature sensor 50 are fixed with resin, the temperature sensor 50 is prevented also from moving relatively to the neutral conductor bus bar 30 toward the other side in the third direction. Thus, the temperature sensor 50 is prevented from moving relatively to the neutral conductor bus bar 30 in all directions, and the temperature sensor 50 is completely fixed to the neutral conductor bus bar 30.

Figure 7A:
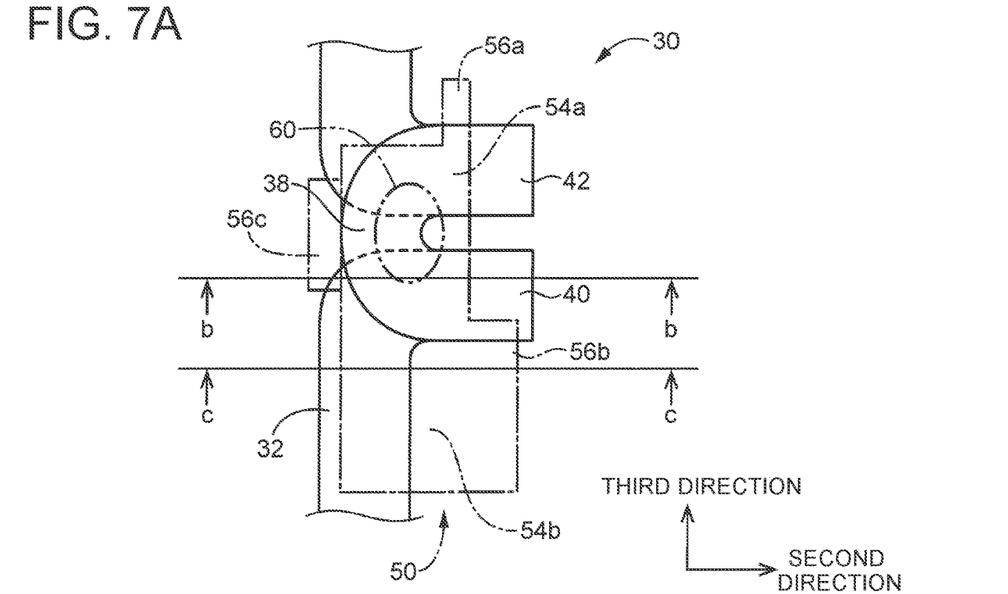
FIG. 7A is a view as seen from one side in a first direction, illustrating the state shown in FIG. 6B where the temperature sensor is retained by being inserted through the gap formed by each of the first U-shaped part and the second U-shaped part of the neutral conductor bus bar.
Figure 7B:
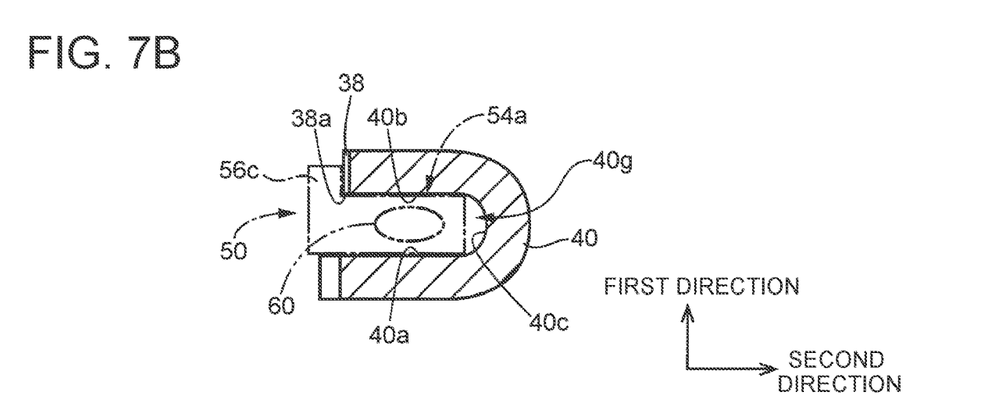
FIG. 7B is a sectional view taken along line b-b in FIG. 7A, illustrating the state as seen from the other side in a third direction.
Figure 7C:
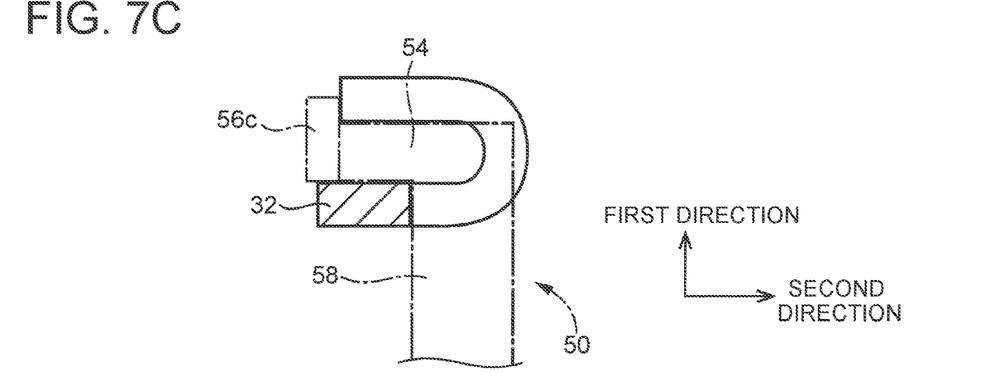
FIG. 7C is a sectional view taken along line c-c in FIG. 7A, illustrating the state as seen from the other side in the third direction.

FIG. 7A to FIG. 7C are views illustrating the state shown in FIG. 6B where the temperature sensor 50 is retained by being inserted through the gaps 40g, 42g formed by the first U-shaped part 40 and the second U-shaped part 42, respectively, of the neutral conductor bus bar 30. FIG. 7A is a view as seen from the one side in the first direction (the direction parallel to the axis CL), and FIG. 7B and FIG. 7C are sectional views taken along lines b-b and c-c, as seen from the other side in the third direction. In FIG. 7A to FIG. 7C, the neutral conductor bus bar 30 is indicated by solid lines and dashed lines, and for reference, the temperature sensor 50 is indicated by long dashed short dashed lines and the rough housing position of the temperature detection element 60 is indicated by long dashed double-short dashed lines. The cutting-plane line b-b and the cutting-plane line c-c shown in FIG. 7A are respectively the cutting-plane line of the sectional view of FIG. 7B and the cutting-plane line of the sectional view of FIG. 7C.

As shown in FIG. 7A to FIG. 7C, the insertion portion 54a of the temperature sensor 50 where the temperature detection element 60 is housed is retained in a state of being in contact with or close to the pair of opposite surfaces 40a, 40b of the first U-shaped part 40 and the pair of opposite surfaces 42a, 42b of the second U-shaped part 42 by being held between these pairs of opposite surfaces. Thus, the insertion portion 54a of the temperature sensor 50 is in contact or substantially in contact with the pair of opposite surfaces 40a, 40b of the first U-shaped part 40 and the pair of opposite surfaces 42a, 42b of the second U-shaped part 42. Therefore, the temperature sensor 50 receives heat of the neutral conductor bus bar 30 from each of the pair of opposite surfaces 40a, 40b of the first U-shaped part 40 and the pair of opposite surfaces 42a, 42b of the second U-shaped part 42. Further, the temperature sensor 50 receives heat of the neutral conductor bus bar 30 also from the inner circumferential surface 40c of the first U-shaped part 40 and the inner circumferential surface 42c of the second U-shaped part 42. The insertion portion 54a of the temperature sensor 50 is in contact with the connection surface 38a of the coupling part 38. Therefore, the temperature sensor 50 receives heat of the neutral conductor bus bar 30 also from the connection surface 38a of the coupling part 38. The state where the insertion portion 54a of the temperature sensor 50 is in contact with the connection surface 38a includes a state where the insertion portion 54a is close to, i.e., substantially in contact with, the connection surface 38a.

In this embodiment, (a) the neutral conductor bus bar 30 has the bus bar main body 32 that is extended into an elongated shape in the circumferential direction of the stator core 20, and the connection terminals 34 that connect the bus bar main body 32 and the coils 16 to each other; (b) the first U-shaped part 40 that is bent so as to form the pair of opposite surfaces 40a, 40b facing each other, and the second U-shaped part 42 that is bent so as to form the pair of opposite surfaces 42a, 42b facing each other are provided side by side in the bus bar main body 32; (c) the one opposite surface 40a of the pair of opposite surfaces 40a, 40b and the one opposite surface 42a of the pair of opposite surfaces 42a, 42b are located in the same plane, and the other opposite surface 40b of the pair of opposite surfaces 40a, 40b and the other opposite surface 42b of the pair of opposite surfaces 42a, 42b are located in the same plane; and (d) the temperature sensor 50 is retained by being inserted through the gap 40g between the pair of opposite surfaces 40a, 40b and the gap 42g between the pair of opposite surfaces 42a, 42b. Thus, the temperature sensor 50 is retained by being inserted through the gaps 40g, 42g between the pair of opposite surfaces 40a, 40b and the pair of opposite surfaces 42a, 42b, i.e., more than one gap. Compared with when the temperature sensor 50 is retained by being inserted through a single gap, the heat receiving area of the temperature sensor 50 that receives heat from the neutral conductor bus bar 30 can be increased to maintain the measurement accuracy of the temperature in the neutral conductor bus bar 30. For example, having a large heat receiving area, the temperature sensor 50 can achieve high responsiveness to changes in the temperature of the neutral conductor bus bar 30 in temperature measurement. Moreover, having a large heat receiving area, the temperature sensor 50 is likely to maintain robustness in measurement accuracy even when the mounting position of the temperature sensor 50 deviates to some extent in the insertion direction while the temperature sensor 50 is mounted so as to be retained by being inserted through the gap 40g between the pair of opposite surfaces 40a, 40b and the gap 42g between the pair of opposite surfaces 42a, 42b in the bus bar main body 32.

In this embodiment, (a) the bus bar main body 32 is extended into an elongated shape in the circumferential direction of the stator core 20, and (b) the first U-shaped part 40 and the second U-shaped part 42 are extended toward the outer circumferential side in the radial direction of the stator core 20 and then bent toward the inner circumferential side in the radial direction. The gap 40g between the pair of opposite surfaces 40a, 40b formed by the first U-shaped part 40 and the gap 42g between the pair of opposite surfaces 42a, 42b formed by the second U-shaped part 42 both open in the circumferential direction of the stator core 20. This allows the temperature sensor 50 to be inserted along the circumferential direction of the stator core 20 in which these gaps 40g, 42g open, which can increase the efficiency with which the temperature sensor 50 is mounted to the neutral conductor bus bar 30.

In this embodiment, the first U-shaped part 40 and the second U-shaped part 42 are each bent into a U-shape in a plane including the axis CL. Surfaces through which the temperature sensor 50 can receive heat from the bus bar 30 include, other than the pair of opposite surfaces 40a, 40b and the pair of opposite surfaces 42a, 42b, the inner circumferential surfaces 40c, 42c of the first U-shaped part 40 and the second U-shaped part 42 bent into a U-shape. Thus, the temperature sensor 50 can receive more heat from the neutral conductor bus bar 30 and maintain the measurement accuracy of the temperature in the neutral conductor bus bar 30.

In this embodiment, (a) the thickness direction of the bus bar main body 32 is a direction parallel to the axis CL of the stator core 20, and (b) the connection terminals 34 have a structure of being extended from the bus bar main body 32 toward the inner circumferential side in the radial direction of the stator core 20 and then bent in a direction parallel to the axis CL. The connection terminals 34 have a structure of being extended from the bus bar main body 32 toward the inner circumferential side in the radial direction of the stator core 20 and then bent only at one part in a direction parallel to the axis CL of the stator core 20. Thus, the distance between the bus bar main body 32 and the connection terminal 34 in the radial direction can be reduced to keep the size of the neutral conductor bus bar 30 down.

In this embodiment, (a) the coupling part 38 that is bent into a U-shape and couples the first U-shaped part 40 and the second U-shaped part 42 to each other is formed between the first U-shaped part 40 and the second U-shaped part 42; (b) the coupling part 38 has the connection surface 38a that is located in the same plane as those opposite surfaces 40b, 42b of the pair of opposite surfaces 40a, 40b and the pair of opposite surfaces 42a, 42b that are located on the side of the coupling part 38; and (c) the temperature sensor 50 is in contact with the connection surface 38a. Surfaces through which the temperature sensor 50 can receive heat from the neutral conductor bus bar 30 include, other than the pair of opposite surfaces 40a, 40b and the pair of opposite surfaces 42a, 42b, the connection surface 38a of the coupling part 38. Thus, the temperature sensor 50 can receive more heat from the neutral conductor bus bar 30 and maintain the measurement accuracy of the temperature in the neutral conductor bus bar 30.

In this embodiment, the area of the cross-section of each of the first U-shaped part 40, the second U-shaped part 42, and the coupling part 38 cut along the width direction is equal to the area of the cross-section of the bus bar main body 32 cut along the width direction. This allows a current to flow through the neutral conductor bus bar 30 at the same current density in the first U-shaped part 40, the second U-shaped part 42, and the coupling part 38 and in the bus bar main body 32. As a result, the neutral conductor bus bar 30 is likely to generate an equal amount of heat at parts in the longitudinal direction, including the first U-shaped part 40, the second U-shaped part 42, and the coupling part 38, which helps maintain the measurement accuracy of the temperature in the neutral conductor bus bar 30.

In this embodiment, (a) the coils 16 are Y-connected three-phase coils, and (b) the bus bar main body 32 is a neutral conductor of the coils 16. Heat generated in each of the coils 16 of the Y-connected three-phase coils is conducted to the neutral conductor bus bar 30 from the one end of the coil 16. Therefore, the temperature sensor 50 retained by the neutral conductor bus bar 30 can accurately measure the temperature of the coils 16 wound around the stator core 20.

While the embodiment of the present disclosure has been described in detail above based on the drawings, the present disclosure can be implemented also with other aspects.

In the above-described embodiment, the first U-shaped part 40 and the second U-shaped part 42 are extended toward the outer circumferential side in the radial direction of the stator core 20 and then bent into a U-shape toward the inner circumferential side in the radial direction. However, an applicable embodiment of the present disclosure is not limited to this aspect. For example, the first U-shaped part 40 and the second U-shaped part 42 may be extended toward the one side in a direction parallel to the axis CL of the stator core 20 and then bent into a U-shape toward the other side in the direction parallel to the axis CL. In the case of this aspect, it is preferable that the bus bar main body 32 have an elongated shape extended in the circumferential direction of the stator core 20 and that the thickness direction of the bus bar main body 32 lie along the radial direction. The pair of opposite surfaces 40a, 40b and the pair of opposite surfaces 42a, 42b of the first U-shaped part 40 and the second U-shaped part 42 need not entirely face each other in the width direction as in the above-described embodiment, and should face each other at least partially in the width direction.

In the above-described embodiment, the first U-shaped part 40 corresponding to the first bent part and the second U-shaped part 42 corresponding to the second bent part are each bent into a U-shape, but an applicable embodiment of the present disclosure is not limited to this aspect. For example, each of the first bent part and the second bent part may be a part that is bent into a V-shape and has a pair of opposite surfaces facing each other across a gap.

In the above-described embodiment, the thickness direction of the bus bar main body 32 is a direction parallel to the axis CL of the stator core 20, and the connection terminals 34 have a structure of being extended from the bus bar main body 32 toward the inner circumferential side in the radial direction of the stator core 20 and then bent in a direction parallel to the axis CL, but an applicable embodiment of the present disclosure is not limited to this aspect. For example, the thickness direction of the bus bar main body 32 may lie in the radial direction of the stator core 20. In the case of this configuration, for example, the connection terminals 34 have a structure of being bent from the bus bar main body 32 toward the inner circumferential side in the radial direction of the stator core 20 and further bent in a direction parallel to the axis CL.

In the above-described embodiment, the temperature sensor 50 measures the temperature of the neutral conductor bus bar 30, but an applicable embodiment of the present disclosure is not limited to this aspect. For example, the bus bar of which the temperature is measured by the temperature sensor 50 may be one of the terminal bus bars 18U, 18V, 18W connected to the other ends of the three-phase coils 16. Heat generated in the three-phase coils 16 is conducted from the other ends of the coils also to the terminal bus bars 18U, 18V, 18W connected to the respective coils. Therefore, the temperature sensor 50 that is retained by being inserted through the gap of the bent part 36 provided in one of the terminal bus bars 18U, 18V, 18W can measure the temperature of the coils 16 wound around the stator core 20.

In the above-described embodiment, the bus bar main body 32 is extended into an elongated shape in the circumferential direction of the stator core 20, but an applicable embodiment of the present disclosure is not limited to this aspect. For example, when the bus bar of which the temperature is measured by the temperature sensor 50 is one of the terminal bus bars 18U, 18V, 18W, the bus bar main body 32 need not necessarily extend in the circumferential direction of the stator core 20 and may instead extend in the radial direction as shown in FIG. 2.

In the above-described embodiment, the bent part 36 is provided between the connection terminal 34V and the connection terminal 34W, but an applicable embodiment of the present disclosure is not limited to this aspect. For example, the bent part 36 may be provided between the connection terminal 34U and the connection terminal 34V, or the bent part 36 may be provided at the end of the bus bar main body 32 on the one side or the other side in the circumferential direction.

In the above-described embodiment, the coils 16 wound around the stator core 20 have a three-phase, three-coil configuration, but an applicable embodiment of the present disclosure is not limited to this aspect. For example, the coils 16 wound around the stator core 20 may have other configuration, such as a three-phase, six-coil configuration. For example, in the case of a three-phase, six-coil configuration, each of the connection terminals 34U, 34V, 34W is provided at two locations in the corresponding phase in the neutral conductor bus bar 30. One end of each of the coils in the three-phase six-coil configuration is connected to the neutral conductor bus bar 30. The terminal bus bars 18U, 18V, 18W are extended into an elongated shape in the circumferential direction of the stator core 20, and the other ends of the respective coils in the three-phase six-coil configuration are connected to the terminal bus bars 18U, 18V, 18W.

What has been described above is merely an embodiment of the present disclosure, and the present disclosure can be implemented with various changes and improvements made to its aspects based on the knowledge of those skilled in the art within the scope of the gist of the present disclosure.

What is claimed is:

1. A stator of a rotating electrical machine for a vehicle, the stator comprising:
   a coil wound around a stator core having a cylindrical shape centered on an axis;
   a bus bar connected to the coil; and
   a temperature sensor that measures a temperature in the bus bar, wherein:
   the bus bar has a bus bar main body that is extended into an elongated shape, and a connection terminal that connects the bus bar main body and the coil to each other;
   a first bent part that is bent so as to form a pair of first opposite surfaces facing each other, and a second bent part that is bent so as to form a pair of second opposite surfaces facing each other are provided side by side in the bus bar main body;
   a coupling part that is bent into a U-shape and couples the first bent part and the second bent part to each other is formed between the first bent part and the second bent part;
   one of the pair of first opposite surfaces and one of the pair of second opposite surfaces are located in the same plane, and the other of the pair of first opposite surfaces and the other of the pair of second opposite surfaces are located in the same plane; and
   the temperature sensor is retained by being inserted through a gap between the pair of first opposite surfaces and a gap between the pair of second opposite surfaces.

2. The stator of a rotating electrical machine for a vehicle according to claim 1, wherein:
   the bus bar main body is extended into an elongated shape in a circumferential direction of the stator core; and
   the first bent part and the second bent part are extended toward an outer circumferential side in a radial direction of the stator core and then bent toward an inner circumferential side in the radial direction.

3. The stator of a rotating electrical machine for a vehicle according to claim 2, wherein the first bent part and the second bent part are each bent into a U-shape in a plane including the axis.

4. The stator of a rotating electrical machine for a vehicle according to claim 2, wherein:
   a thickness direction of the bus bar main body is a direction parallel to the axis; and
   the connection terminal has a structure of being extended from the bus bar main body toward the inner circumferential side in the radial direction and then bent in a direction parallel to the axis.

5. The stator of a rotating electrical machine for a vehicle according to claim 1, wherein:
   the coupling part has a connection surface that is located in the same plane as those of the pair of first opposite surfaces and the pair of second opposite surfaces that are located on a side of the coupling part; and
   the temperature sensor is in contact with the connection surface.

6. The stator of a rotating electrical machine for a vehicle according to claim 5, wherein an area of a cross-section of each of the first bent part, the second bent part, and the coupling part cut along a width direction is equal to an area of a cross-section of the bus bar main body cut along a width direction.

7. The stator of a rotating electrical machine for a vehicle according to claim 1, wherein:
   the coil is one of Y-connected three-phase coils; and
   the bus bar main body is a neutral conductor of the coil.

8. The stator of a rotating electrical machine for a vehicle according to claim 1, wherein:
   the coil is one of multiple coils each having a different phase;
   the connection terminal is one of multiple connection terminals included to the bus bar, a number of the connection terminals corresponding to a number of the coils, the connection terminals extending in an axial direction of the stator and connecting to ends of the coils; and
   the first bent part, the second bent part, and the coupling part are located in a circumferential direction of the stator core between two of the connection terminals.

* * * * *